Dec. 22, 1953
W. V. HARRISON
2,663,199
TRANSMISSION CONTROL
Filed May 22, 1948
4 Sheets-Sheet 1
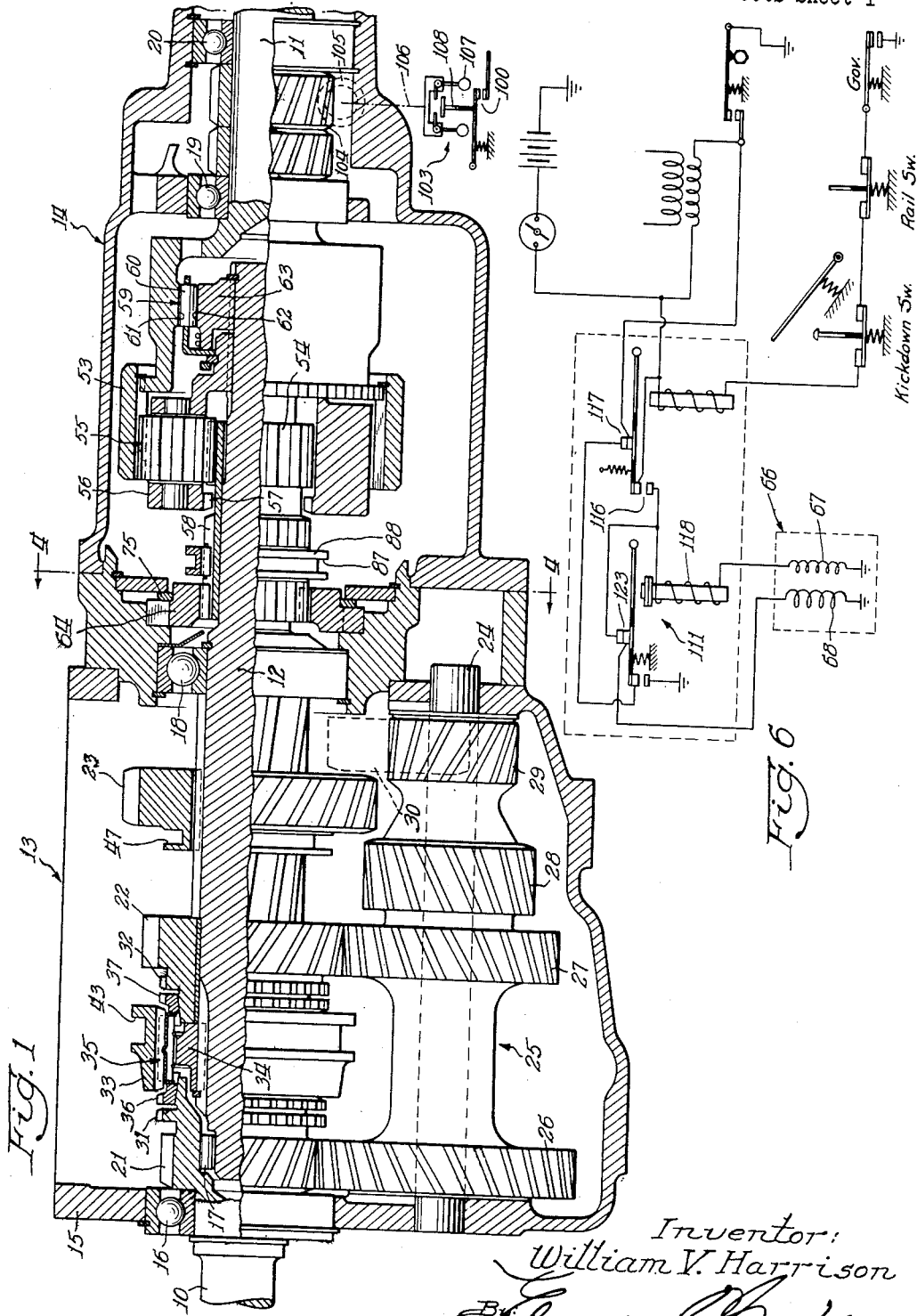
Inventor:
William V. Harrison
By Edward C. Gritzlen
Atty.

Dec. 22, 1953 W. V. HARRISON 2,663,199
TRANSMISSION CONTROL
Filed May 22, 1948 4 Sheets-Sheet 2
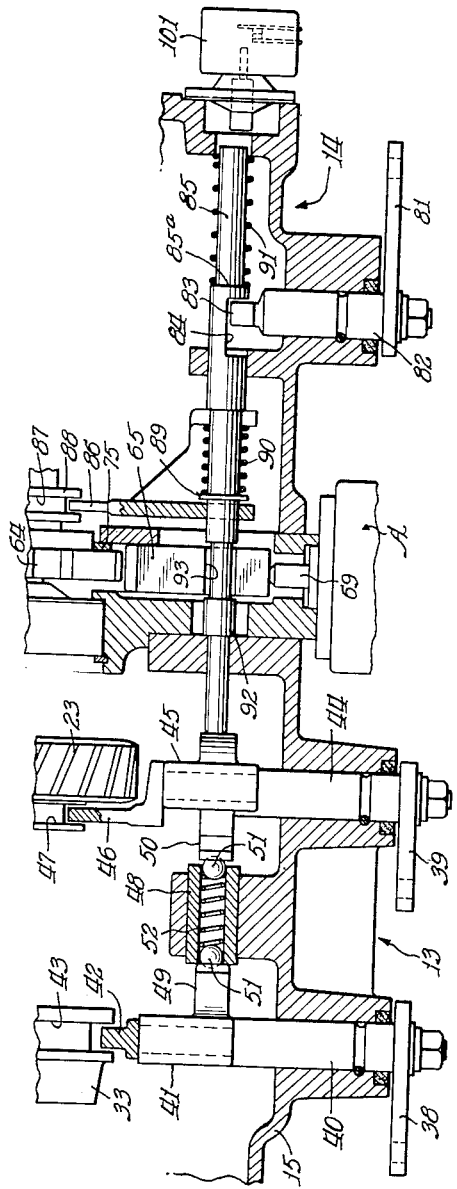
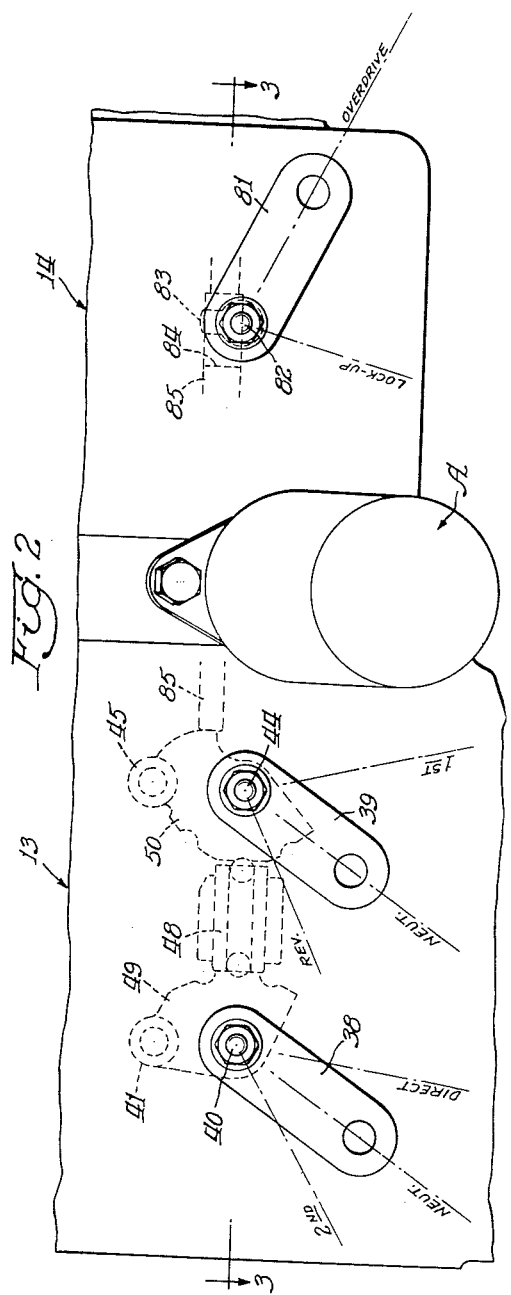
Inventor:
William V. Harrison Dec. 22, 1953      W. V. HARRISON      2,663,199
TRANSMISSION CONTROL
Filed May 22, 1948      4 Sheets-Sheet 3
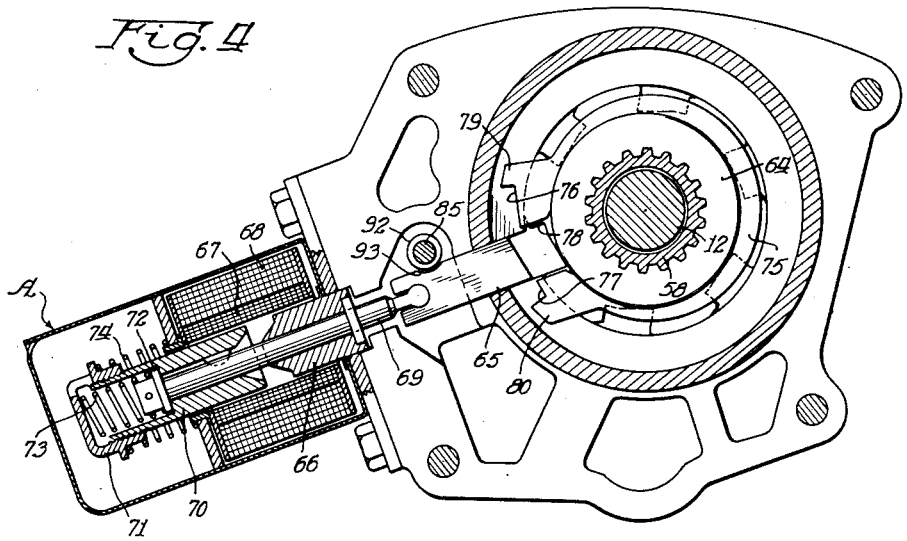
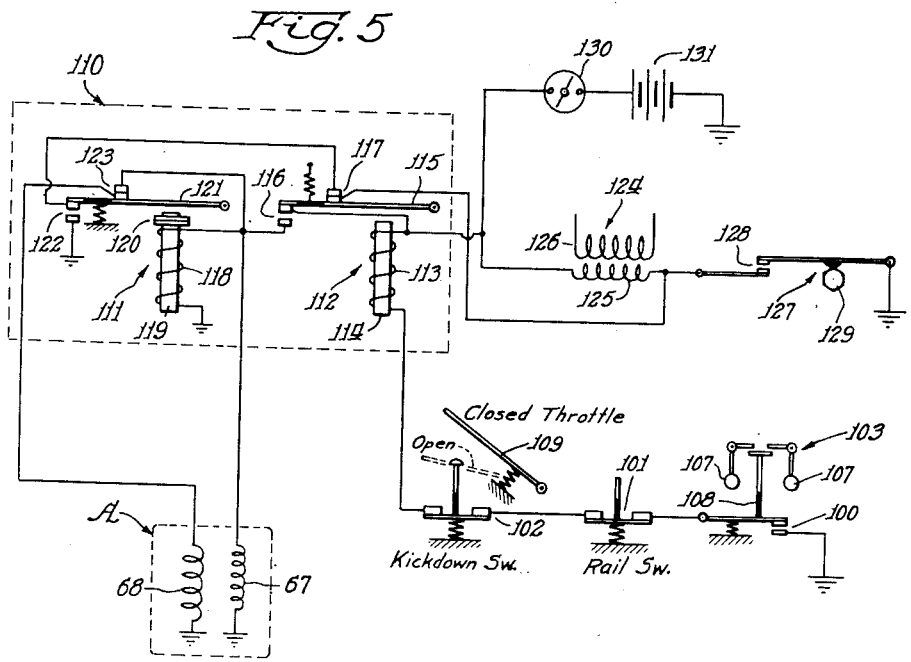
Inventor:
William V. Harrison

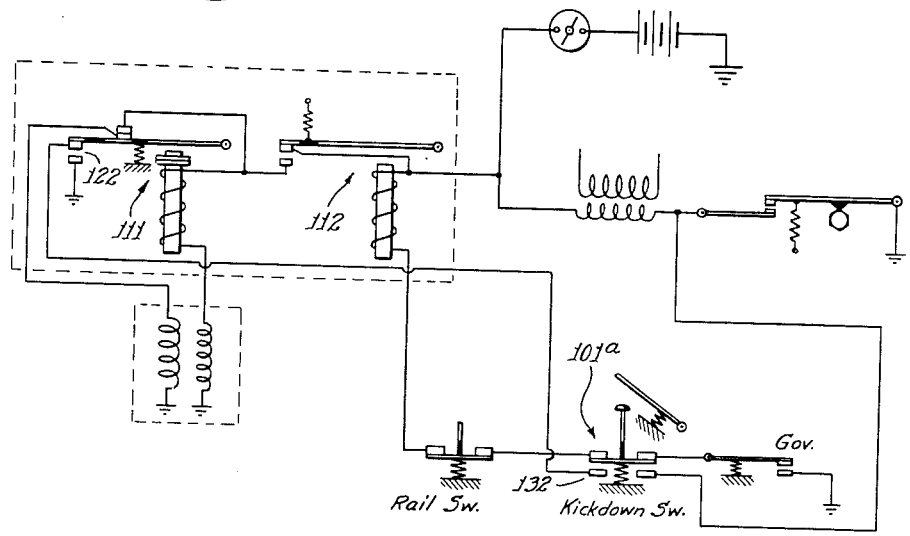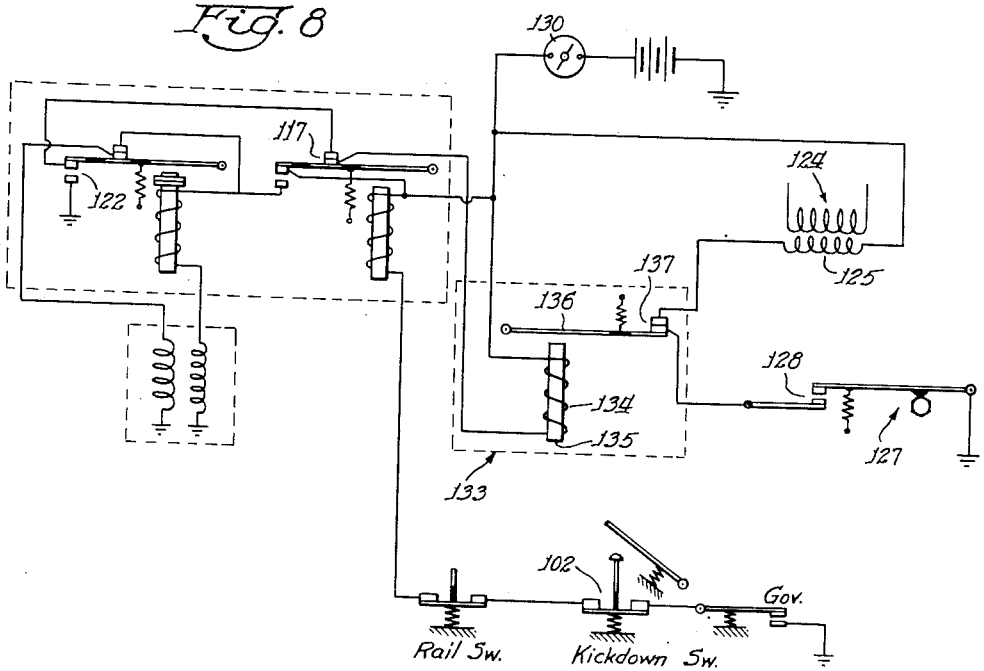

Patented Dec. 22, 1953

2,663,199

UNITED STATES PATENT OFFICE 2,663,199

TRANSMISSION CONTROL

William V. Harrison, Muncie, Ind., assignor to Borg-Warner Corporation, Chicago, Ill., a corporation of Illinois Application May 22, 1948, Serial No. 28,718

13 Claims. (Cl. 74—472)

My invention relates to transmissions for automotive vehicles and more particularly to such transmissions of the planetary type known as overdrives.

Overdrives in common usage at present generally contain an electric solenoid for actuating the pawl of a positive brake for an element of the planetary gear set in the transmission. The solenoid contains an energizing coil and a holding coil which are both energized for moving the pawl into its energized position, generally a brake-engaged position. The energizing coil draws a current which is comparatively large with respect to that taken by the holding coil, and the energizing coil is therefore deenergized by the opening of a switch when the pawl reaches its energized position in which position it is held by means of the holding coil alone. This switch is located within the solenoid and is actuated by means of the pawl.

Such overdrives also generally include means for disabling the ignition system of the vehicle engine whereby a downshift may be had by disengaging the positive brake, and this disabling means includes a switch which is actuated when the pawl reaches its engaged position for terminating the ignition interruption. This switch is also located within the solenoid.

It has been found in actual usage that the contacts of these switches rust and oxidize excessively and also cause rusting and oxidation within the solenoid apart from the switch contacts due to the electrolytic action of the contacts. Overdrives are generally located on the underside of a vehicle, and the solenoids are thus subject to moist conditions due to splashing, etc., and hence this electrolytic action.

It is an object of my invention to provide an improved electric control system for such an overdrive which does not include any contacts located within the solenoid itself and actuated by the pawl and to instead provide switches for performing the functions of the two sets of contacts just mentioned which may be placed within the engine compartment of the vehicle or in any other location which will preferably be relatively dry.

It is a more specific object of the invention to provide such an electrical control system for overdrives which includes a delay relay. The delay relay may actuate both sets of contacts and open a set in series with the energizing coil of the solenoid a predetermined time after energization of both the solenoid and delay relay, which time is sufficient for allowing the full travel of the pawl. The other set of contacts actuated by the delay relay are actuated a predetermined time after deenergization of the delay relay, and these contacts are in an ignition interrupting circuit so that the ignition is restored to normal operation on such actuation. The delay in the relay is sufficient so that the pawl may be completely pulled out of its engaged position to disengage the brake on deenergization of the relay.

My invention consists of the novel constructions, arrangements and devices to be hereinafter described and claimed for carrying out the above stated objects and such other objects as will appear from the following description of preferred embodiments of the invention, illustrated with reference to the accompanying drawings, in which:

Fig. 1 is a longitudinal sectional view of a combined countershaft gear unit and overdrive transmission particularly adapted for automotive vehicles;

Fig. 2 is a partial side view of the transmission;

Fig. 3 is a fragmentary sectional view taken on line 3—3 of Fig. 2;

Fig. 4 is a sectional view taken on line 4—4 of Fig. 1; and

Figs. 5, 6, 7 and 8 are electrical diagrams showing the electric systems which may be used with the transmission illustrated in Figs. 1 to 4.

Like characters of reference designate like parts in the several views.

Referring now to Figs. 1 to 4 in particular, the illustrated transmission comprises a drive shaft 10, a driven shaft 11, and an intermediate shaft 12. A countershaft type transmission unit 13 is effectively interposed between the shafts 10 and 12, and a planetary overdrive type gear unit 14 is effectively interposed between the shafts 12 and 11. The shaft 12 thus constitutes a driven shaft with respect to the countershaft unit 13 and a drive shaft with respect to the planetary gear unit 14. The shaft 10 is adapted to be connected to the ordinary driving engine of the automotive vehicle (not shown), and the shaft 11 is adapted to be connected to the driving wheels (not shown) of the vehicle by any suitable connections. A casing 15 is provided for the units 13 and 14, and the shaft 10 is rotatably disposed within the transmission casing 15 by means of a bearing 16. The shaft 12 is piloted within the shaft 10 by means of a bearing 17 and is rotatably disposed within the casing 15 by means of a bearing 18. The shaft 11 is rotatably disposed within the casing 15 by means of bearings 19 and 20.

The countershaft gear unit 13 comprises a gear 21 formed on the shaft 10, a gear 22 rotatably disposed on the shaft 12 and a gear 23 splined on the shaft 12. A countershaft 24 is fixed within the transmission case 15, and a countershaft cluster gear 25 is rotatably disposed on the shaft 24. The cluster gear 25 comprises gears 26, 27, 28 and 29, and the gears 26 and 27 are respectively in mesh with the gears 21 and 22. The gear 23 is adapted to be moved into mesh with the gear 28. The gear 29 is in mesh with an idler gear 30 rotatably disposed in the transmission case 15, and the gear 23 is adapted to mesh also with the idler gear. The gears 21 and 22 are respectively provided with clutch teeth 31 and 32 and a clutch sleeve 33 slidably disposed on a hub member 34 fixed on the shaft 12 is adapted to mesh with both sets of the clutch teeth. Synchronizing mechanism 35 comprising blocker synchronizer rings 36 and 37 is provided for the sleeve 33, and this mechanism functions to synchronize the teeth 31 or 32 with the sleeve 33 prior to engagement thereof and to prevent such engagement until synchronization.

The countershaft unit 13 provides low, intermediate and high speeds in forward drive and a drive in reverse. The gear 23 is shifted into mesh with the gear 28 for low speed forward drive, and the gear train is then from the shaft 10 through the gears 21 and 26 and the gears 28 and 23 to the shaft 12. Second or intermediate forward speed is completed by engaging the clutch sleeve 33 with the teeth 32, and the power train is from the shaft 10 through the gears 21 and 26 and the gears 27 and 22 and through the clutch teeth 32, the sleeve 33 and hub member 34 to the shaft 12. High speed forward drive is obtained by engaging the clutch sleeve 33 with the teeth 31, and the drive is from the shaft 10 through the teeth 31, the sleeve 33 and hub member 34 to the shaft 12. Reverse drive is completed by engaging the gear 23 with the idler gear 30, and the drive is from the shaft 10 through the gears 21 and 26, and the gears 29, 30 and 23 to the shaft 12.

The sleeve 33 and gear 23 are shifted by means of levers 38 and 39 located on the outside of the transmission case 15. The lever 38 is fixed on a shaft 40 rotatably disposed in the case, and this shaft carries a lever 41 which in turn carries a fork 42. The fork 42 is disposed within a groove 43 in the sleeve 33, and swinging movement of the lever 38 acts through the members 40, 41 and 42 to move the sleeve 33 into either of its engaged positions. The gear 23 is shifted by means of the external lever 39 which is fixed on a shaft 44 rotatably disposed in the case 15, and a lever 45 is fixed on the inside end of the shaft 44. The lever 45 carries a fork 46 which is disposed in a groove 47 in the gear 23, and this gear is shifted by a swinging movement of the lever 39 transmitted through the parts 44, 45 and 46.

An interlock sleeve 48 is slidably disposed in a portion of the case 15 and acts between sectors 49 and 50 of the shift levers 41 and 45 so as to prevent the movement of one of the levers 38 and 39 while the other is in any of its positions except neutral. Balls 51 acted on by a spring 52 are provided within the sleeve 48, and these balls cooperate with the sectors 49 and 50 so as to yieldably hold the shift levers 38 and 39 and the parts connected therewith in their neutral or power train completing positions.

The overdrive unit 14 comprises a ring gear 53, a sun gear 54, planet gears 55 in mesh with the sun and ring gears and a carrier 56 for the planet gears. The carrier 56 is splined onto the intermediate shaft 12; the sun gear 54 is rotatably mounted on this shaft; and the ring gear 53 is connected with the driven shaft 11. The carrier 56 is provided with clutch teeth 57, and the sun gear 54 is provided with teeth 58. The sun gear 54 is slidable longitudinally on the shaft 12 so that its teeth 58 may be meshed with the teeth 57.

A one-way clutch 59 is provided between the shafts 12 and 11. This clutch comprises rollers 60 acting between opposing cam surfaces 61 and 62. The cam surfaces 61 and 62 are formed respectively on the inner surface of the shaft 11 and on a hub member 63 which is splined on the shaft 12. The cam surfaces 61 and 62 of the clutch are so arranged that the rollers 60 will engage between the surfaces so that the shaft 12 may drive the shaft 11 in the forward direction (that is, in the same direction the shaft 10 is rotated by the vehicle engine).

As will hereinafter be described in greater detail, the sun gear 54 is the reaction member of the gear set, and this member is held stationary by means of a positive brake mechanism now to be described. The brake mechanism comprises a slotted element 64 splined on to the sun gear 54 and a pawl 65 adapted to engage the slotted element. The pawl 65 is slidably disposed in the transmission case 15 and is operated by an electric solenoid A. The electric solenoid comprises a magnetizable core 66 having a holding coil 67 and an operating coil 68 disposed about it. A plunger 69 is slidably disposed within the core 66 and is connected with the pawl 65. An armature 70 is keyed on the plunger 69 and has an annular cap-like element 71 screwed on to its outer end. The plunger 69 has a washer-like element 72 pinned thereto, and a spring 73 is disposed within the element 71 and between the inner end of this element and the element 72. Another spring 74 is disposed between the element 71 and a part of the casing of the solenoid, as shown. When the coils 67 and 68 are energized, the armature 70 is drawn toward the core 66 against the action of the spring 74 and through the spring 73 pushes the plunger 69 and pawl 65 inwardly.

A balk ring 75 is held in frictional contact with the slotted element 64 and the balk ring therefore tends to rotate with the slotted element. The balk ring is provided with ledges 76 and 77 disposed on opposite sides of a slot 78 in the ring, with the slot being arranged so that the pawl 65 can move into it and into one of the slots in the element 64 and the ledges 76 and 77 being arranged so that the pawl 65 will engage on either of the ledges when the balk ring is rotated from its position in which it is shown and the pawl thereby cannot enter any of the slots in the element 64. The balk ring 75 is provided with radially extending fingers 79 and 80, and these cooperate with the pawl 65 to limit the oscillation that the balk ring may have.

The sun gear 54 is controlled in its longitudinal movement along the shaft 12 by a shift lever 81 or else by the shift lever 39. The shift lever 81 is fixed to a shaft 82 rotatably disposed in the case 15. The shaft 82 carries a lever portion 83 disposed within a slot 84 in a shift rail 85. The rail 85 is slidable longitudinally with respect to the casing 15, and the rail carries a shift fork 86 extending into a slot 87 in a collar 88 fixed with respect to the sun gear 54. A spring washer 89 is fixed on the rail 85, and a spring 90 is disposed between the washer 89 and the fork 86. Swinging movement of the lever 81 by means of the shaft 82 and lever portion 83 has the effect of moving the rail 85 to the right as seen in Fig. 1 to cause a corresponding movement of the sun gear 54 whereby to engage the teeth 58 with the teeth 57.

The rail 85 extends also into cooperative relation with the sector 50, and as will be noted, the outline of this sector is such as to give the same movement to the rail 85 to the right to engage the teeth 58 with the teeth 57 when the gear 23 is moved into its reverse position. A spring 91 is provided between the case 15 and a shoulder 85a on the rail, and this spring functions to move the rail to the left after movement of the rail to the right as has been described.

An interlock is provided between the pawl 65 and the shift rail 85, and this comprises a shoulder 92 formed on the shaft 85 adapted to enter a slot 93 in the pawl 65. The arrangement is such that when the teeth 58 are in engagement with the teeth 57 the shoulder 92 is in the slot 93, and the pawl 65 is then held against movement to engage the slotted element 64. When the pawl 65 is in engagement with the slotted element 64, the shoulder 92 then has the function of preventing a movement of the fork 86 and the sun gear 54 to engage the teeeth 58 with the teeth 57 since the shoulder would abut against the side of the pawl with such movement. The interlock between the pawl 65 and the shaft 85 thus has the function of preventing a simultaneous engagement of the pawl 65 and the clutch teeth 57 and 58.

The planetary gear set 14 functions to provide an overdrive between the shafts 12 and 11 when the pawl 65 is effective to brake the slotted element 64 and sun gear 54. With the planet gear carrier 56 being driven by the shaft 12 and the sun gear 54 being held stationary by the pawl, the ring gear 53 and thereby the shaft 11 are driven at an overdrive. When the pawl 65 is out of engagement with the slotted element 64, the gear set comprising the ring gear 53, the sun gear 54 and the planet gears 55 is thereafter not effective, and the drive from the shaft 12 to the shaft 11 proceeds through the one-way clutch 59 which functions to drive the shaft 11 at the same speed as the shaft 12. This one-way clutch 59 gives a freewheeling type of drive, and when it is desired to lock up the planet gear set to provide a two-way 1—1 drive between the shafts 12 and 11, the sun gear 54 is shifted to engage the clutch teeth 58 with the clutch teeth 57. All of the parts of the planet gear set are thus locked together to rotate as a unit. The rail 85 may be shifted by means of the lever 81 to mesh the teeth 58 and 57 to provide this 1—1 drive, and the sector 50 of the shift lever 45 is also effective for causing movement of the shift rail 85 to lock up the planet gear set when the shift lever 39 is swung to move the gear 23 to its reverse drive position in mesh with the idler gear 38. The sector is arranged to operate in this manner so that the reverse drive may proceed around the one-way clutch 59 which is so constructed that it transmits drive in the forward direction and it therefore will not transmit drive in the reverse direction.

The transmission arrangements hereinbefore described are quite similar to such arrangements which have been in use for some time, and I deem as the principal feature of my invention the provision of an electric control system for such transmission arrangements which utilizes such a solenoid as is shown which does not include any electric switches within the solenoid itself. Such electrical controls will now be described.

Referring now in particular to Fig. 5, the electrical control system for the solenoid A comprises a governor switch 100, a rail switch 101 and a kickdown switch 102. The governor switch 100 is a part of a centrifugal governor 103 which is driven from the shaft 11 by gears 104 and 105 and suitable power transmitting means such as a shaft 106. The governor 103 may be of any suitable type and may comprise weights 107 which when moved outwardly under the influence of centrifugal force operate on a plunger 108 which closes the switch 100. The rail switch 101 is positioned to be actuated by the rail 85, and this switch is opened when the rail 85 is moved to a position to engage the clutch teeth 58 with the clutch teeth 57. The kickdown switch 102 is adapted to be actuated by the accelerator 109 of the vehicle in which the transmission is installed. The switch 102 is in its closed condition for all ordinary driving positions of the accelerator; however, when the accelerator is moved to its wide open throttle position, the accelerator is effective in this position to open the switch 102.

The electric control system comprises a relay assembly 110 which includes in reality two relays 111 and 112. The relay 112 comprises a winding 113 disposed on a core 114 and adapted to actuate an armature 115. The relay comprises a set of contacts 116 and 117, and the armature 115 carries one of the contacts 116 and one of the contacts 117. In the deenergized condition of the relay 112, it will be noted that the contacts 117 are closed and the contacts 116 are open.

The relay 111 comprises a winding 118 on a core 119. The core 119 is provided with a plurality of slugs 120 in the form of washers disposed about it for purposes to be described. The core 119 is effective on an armature 121, and this armature carries one of a set of contacts 122 and the one of a set of contacts 123. As will be noted, in the deenergized condition of the relay 111, the contacts 122 are open and the contacts 123 are closed.

The electrical control arrangement includes the ordinary ignition system of an automotive vehicle comprising an induction coil 124 having a primary winding 125 and a secondary winding 126, and an interrupter 127. The interrupter comprises a switch 128 which is opened and closed by means of a rotating part 129 for the purpose of producing an interrupted current through the primary winding 125. The primary winding 125 is connected with the usual ignition switch 130 which in turn is connected to the vehicle battery 131.

As will be noted, the switches 100, 101 and 102 are connected in series with each other and with the winding 113 of the relay 112. The winding 113 is connected with the ignition switch 130. The contacts 116 are connected with the ignition switch 130 and also with the winding 118 of the relay 111. The holding coil 67 of the solenoid A is also connected with one of the contacts 116 as shown. One of the contacts 117 is connected to a point in the ignition system between the interrupter 127 and the induction coil 124, and the other contact 117 is connected to a contact 122 in the relay 111. The other contact 122 is grounded, as shown. One of the contacts 123 is connected to one of the contacts 116 as shown, and the other contact 123 is connected with the actuating winding 68 of the solenoid A. As will be noted, the battery 131, the governor switch 100, the two solenoid windings 67 and 68, and the relay winding 118 are grounded, in addition to one of the contacts 122 already mentioned as grounded.

The slugs 120 are provided on the core 119 to retard the building up and decay of the magnetic flux in the core 119, and these slugs thus have the effect of providing a delayed actuation of the armature 121 upon current being applied in the winding 118 and of causing a delayed returning of the armature 121 to its deenergized position when current is discontinued through the winding 118. The slugs 120 thus make the relay 111 a delayed action relay.

When the vehicle is traveling below the critical speed of the governor 103, either in the low, intermediate or high speed ratios of the countershaft unit 13, the condition of the circuit just described is as shown in Fig. 5 with the relays 111 and 112 both being deenergized. When the speed of the vehicle increases so that the governor switch 100 is closed, as when the vehicle is traveling in the high speed ratio of the countershaft unit 13, the circuit through the relay winding 113 is thereby completed to energize the relay 112. This circuit is from the battery 131, through the ignition switch 130, the winding 113, and the switches 102, 101 and 100. The relay 112 upon being so energized has its contacts 117 open and its contacts 116 closed.

Closure of the contacts 116 in the relay 112 has the effect of connecting both the energizing coil 68 and the holding coil 67 of the solenoid A with the battery 131, as will be apparent. The lower one of the contacts 116 is connected directly with the coil 67 and through the contacts 123 with the coil 68, and the upper contact 116 is connected with the battery through the ignition switch whereby the circuits through both coils are completed. The two coils 67 and 68 of the solenoid being thus energized causes the armature 70 to move into its energized position in which the armature is in contact with the core 66. This movement of the armature 70 is against the action of the springs 73 and 74. The spring 74 is effective on the plunger 69 and thereby moves the pawl 65 into engagement with the ledge 76 of the balk ring 75. Since the engine is driving through the countershaft unit and through the freewheeling unit 59, the balk ring 75 is in a position so that this ledge is contacted by the pawl to prevent movement of the pawl into engagement with the slotted element 64. When the accelerator is subsequently released so that the engine ceases to drive, the gearing of the planetary gear set 14 is operative so as to cause a rotation of the sun gear 54 which moves the balk ring 75 to a position in which the slot 78 in the balk ring is in alignment with the pawl 65 so that the pawl can enter into one of the slots of the slotted element 64. Upon the pawl 65 thus engaging the slotted element, the overdrive power train through the gear set 14 is thus completed.

Simultaneously with the energization of the solenoid A, the winding 118 of the delay relay 111 is energized through the contacts 116 of the relay 112. Due to the delay feature of the relay 111, the core of this relay is not completely magnetized immediately upon application of voltage to the winding through the contacts 116, and for a short period of time the relay 111 remains in its illustrated condition with the contacts 123 closed and with the contacts 122 open. After the delay period of the relay 111 has expired, the core of this relay is completely magnetized, and thereupon the armature 121 of the relay is drawn into its energized position to open the contacts 123 and to close the contacts 122. Opening of the contacts 123 breaks the circuit through the energizing winding 68 of the solenoid A and this coil is thus deenergized. The armature 70 of the solenoid nevertheless remains in its energized position in contact with the core 66 due to the action of the holding coil 67 which remains energized. The delay, incidentally, of the relay 111 is sufficient so that the armature 70 is drawn into its energized position before the relay 111 becomes completely energized to close the contacts 122 and to open the contacts 123.

When the operator of the vehicle, while the vehicle is traveling in overdrive, wishes to downshift from overdrive to direct in the planetary unit 14, he may do so by a depression of the accelerator 109 to its open throttle position. In this position, the accelerator opens the kickdown switch 102 for thereby opening the circuit through the winding 113 of the relay 112 to deenergize the relay. When the relay 112 is deenergized, its contacts 117 are closed and its contacts 116 are opened. The contacts 117 when closed complete an ignition grounding circuit, and this circuit is from ground through the contacts 122 and the contacts 117 to the point between the ignition coil and the interrupter 127 to which one of the contacts 117 is connected. This grounding of the ignition circuit has the effect of disabling the ignition coil 124 so that it does not operate to cause firing of any of the spark plugs of the vehicle engine, and the whole ignition system is disabled so that the driving wheels of the vehicle tend to drive the engine of the vehicle rather than vice versa. The opening of the contacts 116 in the relay 112 has the effect of deenergizing the solenoid A so that the spring 74 tends to move the armature 70 and thereby the plunger 69 and pawl 65 due to the action of the washer-like member 72 back into the deenergized positions of these parts. The grounding of the ignition circuit just described has the effect of temporarily relieving pressure of the slotted element 64 on the pawl 65, this being in effect a torque reversal, and the pawl upon this torque reversal is pulled out of engaged condition with the slotted element. The transmission is then back in direct drive condition with the drive being through the over-running clutch 59.

The opening of the contacts 116 in the relay 112 upon this deenergization of the relay has the effect also of deenergizing the relay 111. The slugs 120 of the relay, however, function to hold the armature 121 of this relay in its energized position in which the contacts 122 are closed for a predetermined time after the contacts 116 have opened. The contacts 122 thus complete the ignition grounding circuit thus described for a predetermined time after deenergization of the relay 112, and this time is sufficient to allow the pawl 65 to be pulled out of engagement with the slotted element 64 as has just been described. When the relay 111 is completely deenergized after this predetermined time has elapsed, then, of course, the armature 121 moves back into its deenergized position to open the contacts 122 and close the contacts 123, and this opening of the contacts 122 has the effect of breaking the ignition grounding circuit, and the ignition is then again operative so that the engine drives the vehicle even though the accelerator 109 may be kept in its wide open throttle position.

The rail switch 101 is adapted to be acted on by the shift rail 85 as has been described, and this switch is opened when the rail 85 is moved into its position in which it is effective to engage the clutch teeth 58 with the clutch teeth 57 for locking up the planetary gear set. As has been described, the rail 85 is so shifted when the countershaft transmission is shifted to its reverse drive condition or else when the vehicle operator wishes to lock up the planetary gear set and does so by actuation of the overdrive shift lever 81. The rail switch 101 being thus opened by such movement of the shift rail 85 functions to prevent an energization of the relay 112 even though the speed of the vehicle increases sufficiently to close the governor switch 100. The rail switch 101 is thus effective to prevent an engagement of the pawl 65 with the slotted element 64 while the teeth 58 and 57 are engaged, this being for the purpose of preventing the overdrive gear set 14 from being in two different two-way drives at once which would cause breakage of some of the parts of the gear set. The shoulder 92 on the rail 85 is also effective for this purpose as has been described.

It will be noted that the circuit for controlling the overdrive gear set 14 just described does not include any switch contacts within the solenoid A itself. In commonly used installations there are at least two sets of such switch contacts within the overdrive solenoids, one set corresponding to the contacts 123 and being for the purpose of breaking the electric circuit through the energizing winding of the solenoid (corresponding to the winding 68) and the other set of contacts corresponding to the contacts 122 and being for the purpose of opening the ignition grounding circuit after the overdrive pawl has moved back to its disengaged position. My contacts 123 and 122 are located in the relay assembly 110 which may be located on the dashboard within the engine compartment, and thus corrosion of these contacts will not occur as might be possible with contacts within the overdrive solenoid A located on the overdrive and underneath the vehicle in which position moisture is likely to enter. Due to this excessive amount of moisture which might be found within the overdrive solenoid A, the contacts 122 and 123 furthermore cannot cause any excessive rusting and oxidation due to any electrolytic action of the contacts which might result if the contacts were within the solenoid.

The modification of the electrical arrangement shown in Fig. 6 differs from that shown in Fig. 5 in that the holding coil 67 instead of being directly connected with the contacts 116 is connected with the winding 118 of the delay relay 111. The energizing coil 68 of the solenoid, as in the Fig. 5 arrangement, is connected with the contacts 123 of the delay relay. The connection of the holding coil 67 with the winding 118 has the effect of increasing the delay of the relay 111 both in energizing and deenergizing the relay, inasmuch as the effective inductance and resistance of the coil 67 is added to the inductance and resistance of the winding 118, since these windings are in series. The circuit shown in Fig. 6 functions substantially in the same manner as the Fig. 5 circuit.

The modified circuit shown in Fig. 7 is substantially the same as that shown in Fig. 6 with the exception that there are no contacts 117 provided in relay 112, and the grounding circuit from the contacts 122 instead proceeds to a set of contacts 132 provided in a kickdown switch 101a. The contacts 132 are closed when the vehicle operator moves the accelerator to wide open throttle position, and this is the time at which the contacts 117 in the arrangements of Figs. 5 and 6 are closed; so the Fig. 7 circuit works at the same time and in substantially the same manner for grounding the ignition as does the Figs. 5 and 6 circuits.

The Fig. 8 circuit is the same as the Fig. 6 circuit with the exception that instead of grounding the ignition, the ignition is cut in order to obtain torque reversal for withdrawing the pawl 65 from the slotted element 64. The contacts 117 in Fig. 8 are connected to an ignition breaking relay 133 instead of to a connection between the ignition coil 124 and the circuit breaker 127. The relay 133 comprises a winding 134 on a core 135. The winding 134 is connected to one of the switch contacts 117 at one end and its other end is connected with the ignition switch 130. An armature 136 is in close proximity to the core so that when the core is magnetized, the armature is drawn to the core into an energized position. The armature 136 carries one of a set of contacts 137 which are so arranged that when the armature is moved to its energized position, it will open the contacts 137. One of the contacts 137 is connected with one of the contacts 128 of the circuit breaker 127, and the other of the contacts 137 is connected with one end of the primary winding 125 of the ignition coil 124. The other end of the primary winding 125 is connected to the ignition switch as shown.

The Fig. 8 circuit functions in the same manner as the Fig. 6 circuit with the exception that the ignition is cut instead of grounded when the kickdown switch 102 is opened at wide open throttle position of the accelerator to kickdown from overdrive. Under ordinary running conditions of the vehicle, the relay 133 is deenergized, and the contacts 137 are closed. These contacts complete the ignition circuit, being connected between the ignition coil 124 and the circuit breaker 127, and when these contacts are open, the ignition circuit is broken and is thereby disabled. The winding 134 is connected in series with the relay contacts 117 and 122, and when both of these sets of contacts are closed in which conditions of the Fig. 5 circuit they would ground the ignition to disable it, in the Fig. 8 arrangement they energize the relay 133 to break the ignition circuit. The net result of the Fig. 8 circuit is the same in disabling the ignition system as the Fig. 5 circuit; however, for some purposes ignition cutting as shown in Fig. 8 is preferred over ignition grounding as shown in Fig. 5.

My improved overdrive circuits advantageously do not include contacts within the overdrive solenoid A itself for either breaking the circuit through the energizing winding 68 or for grounding or cutting the ignition for downshifting. This arrangement makes for satisfactory operation, and difficulties due to oxidation and rusting within the solenoid are obviated.

I wish it to be understood that my invention is not to be limited to the specific constructions, arrangements and devices hereinabove described, except only insofar as the claims may be so limited, as it will be understood that changes may be made without departing from the principles of the invention. In the construction of the appended claims I wish it to be understood that where I specify in the claims a coupling or a positive coupling, I intend to include by this expression not only a brake as is disclosed in the illustrated embodiments of the invention but also a clutch, a brake being understood to be a coupling in which one part to be coupled is stationary

I claim:

1. In electric mechanism, a solenoid having an armature, said solenoid comprising an energizing coil and a holding coil both of which are operative to move said armature into an energized position and said holding coil being sufficient to alone hold the armature in its energized position, and means independent of movement of said armature for automatically breaking the circuit through said energizing coil and not said holding coil a predetermined time after energization of both of said coils, said time being sufficiently great to assure movement of said armature to its energized position.

2. In electric mechanism, a solenoid having a movable armature, an energizing coil and a holding coil energizable simultaneously for moving said armature from a deenergized position to an energized position, and a delay relay having a winding energized simultaneously with said solenoid coils and having a switch operable independently of movement of said armature and connected in series with said energizing coil for breaking the circuit through the energizing coil a predetermined time after energization of the relay winding and coils, said time being sufficient for assuring movement of the armature to its energized position before the circuit is broken through the energizing coil.

3. In a transmission control mechanism, the combination of an electric solenoid having a movable armature and having an energizing coil and a holding coil, said energizing coil and said holding coil being energized simultaneously for moving said movable armature from one position to another, and a delay relay having a winding energized along with the solenoid and having a switch operable independently of movement of said armature and connected in series with said energizing coil for opening the circuit through the latter coil a predetermined time after energization of the relay winding and solenoid which time is sufficient for a movement by the movable armature effected by action of the solenoid.

4. In an overdrive control mechanism for controlling the operation of a movable pawl engageable with a slotted element, the combination of an electric solenoid for moving said pawl, spring means for moving said pawl from an engaging position to a disengaging position, said solenoid including an energizing coil and a holding coil which when both are energized move the pawl from a disengaging position to an engaging position against the action of said spring means, said holding coil when energized being sufficient for holding said pawl in engaging position against the action of said spring means, and a delay relay connected to be energized along with said solenoid and having a switch connected in series with said energizing winding which is opened a predetermined time after energization of the relay and solenoid for deenergizing the energizing coil, said time being sufficient for a movement of said pawl into its engaging position.

5. In a transmission control device for an automotive vehicle having an engine ignition system, the combination of a positive coupling having a movable coupling element, an electric solenoid for moving said coupling element and comprising an energizing coil and a holding coil, means for disabling the ignition system of the vehicle engine for allowing withdrawal of the coupling element from engagement and including a switch, a switch in series with said energizing coil for breaking the circuit through the coil, and delay means independent of movement of the coupling element for actuating said switches for opening said second-named switch a predetermined time after energization of the solenoid and for actuating said first-named switch a predetermined time after a change of energization of said solenoid for causing disablement of the ignition system and allowing disengagement of said coupling.

6. In a transmission control mechanism for controlling the engagement and disengagement of a movable coupling element, the combination of an electric solenoid for moving said movable coupling element, said solenoid comprising an energizing coil and a holding coil which when both are energized move the movable coupling element, ignition apparatus, ignition disabling means for permitting a disengagement of said movable coupling element, a delay relay having two switches, one of said switches being connected in series with said energizing winding and said relay being connected to be energized at the same time as said solenoid so that the switch opens the circuit through the energizing winding a predetermined time after energization of the solenoid which time is sufficient for a movement of the movable coupling element, an accelerator, the other of said switches being connected to said ignition disabling means and with a switch controlled by said accelerator, said two last-named switches disabling said ignition system when said accelerator is moved to an open throttle position and the coupling element is engaged and said delay relay actuating its switch in the disabling means for again rendering the ignition system operative after a predetermined time after it has been made inoperative.

7. In a device for controlling an overdrive mechanism in an automotive vehicle having a vehicle ignition system, the combination of a positive type brake for an element of the overdrive mechanism, said brake including a pawl movable into and out of engagement with a slotted element, an electric solenoid for engaging said pawl with said slotted element when the solenoid is energized, said solenoid comprising an energizing coil and a holding coil, an accelerator for the vehicle and actuating a switch to open the switch when moved to an open throttle position, an electric relay connected with said switch to be controlled thereby and including two switches, a delay relay comprising two switches, one of the switches of said first-named relay being connected with one of the switches of said second-named relay, with the winding of said second relay and with said holding coil, said last-named switch in said delay relay being connected with said energizing winding, the other two of said relay switches being connected in series and with said ignition system whereby when both the switches are closed the ignition system is grounded for disabling the system, said first-named relay when energized energizing said delay relay and said solenoid and the delay relay switch connected in series with the solenoid energizing winding opening after a predetermined time to deenergize this winding, said other switch in said delay relay functioning to open the grounding circuit for the ignition system a predetermined time after both of said relays are deenergized by an opening of said accelerator switch.

8. In a transmission control device for an automotive vehicle having a vehicle ignition system, the combination of an engageable and disengageable positive coupling, said positive coupling comprising a movable coupling element, an electric solenoid for actuating said movable coupling element and comprising an energizing coil and a holding coil which are both energized for moving the coupling element, an accelerator for the vehicle, a switch under the control of the accelerator and closed when the accelerator is moved to an open throttle position, a second switch connected in series with said first-named switch and the two switches being connected to the vehicle ignition system for disabling the system when both switches are closed, a delay relay having an energizing winding and a core with a closed coil about the core for delaying the action of the relay and actuating said second-named switch, the winding of said delay relay being connected in series with said holding coil whereby the delay of the relay is increased for actuating said second-named switch after either deenergization or energization of the delay relay.

9. In electric mechanism, the combination of a movable element, an electric solenoid for moving said element, said solenoid comprising an energizing coil and a holding coil both of which are energized to move said movable element and said holding coil being sufficient for holding the movable element in energized position once it has been moved to this position, a switch in series with said energizing coil, and a delay relay having an actuating winding and actuating said switch, said holding coil and said actuating winding being connected in series for increasing the delay of said relay for opening said switch after energization of said delay relay and holding coil.

10. In a transmission control device, the combination of an electric solenoid for moving an element, said solenoid comprising an energizing coil and a holding coil, a switch in series with said energizing coil, and a delay relay having an actuating winding and opening said switch when energized, said actuating winding being connected in series with said holding coil whereby to increase the delay after energization of the holding coil and delay relay after which said switch is opened to deenergize said energizing coil.

11. In a device for controlling a transmission mechanism in an automotive vehicle having an engine ignition system, the combination of a positive coupling having an engageable and disengageable movable coupling element, a solenoid including a holding coil and an energizing coil which when both are engaged move the movable coupling element, said holding coil alone being sufficient to hold the coupling element in its engaged position, means for disabling the engine ignition and comprising a switch, a second switch in series with said energizing coil, and a delay relay having an actuating winding and adapted to actuate both of said switches, the actuating winding of said delay relay being connected in series with said holding coil whereby to increase the delay of the relay, said switch in series with said energizing coil being opened upon energization of said delay relay and the other of said switches being actuated by the delay relay when deenergized for disabling the ignition system.

12. In an overdrive unit control device for an automotive vehicle having an engine ignition system, the combination of a positive brake for an element of the overdrive unit, said positive brake including a pawl engageable with a slotted element, an electric solenoid for engaging said pawl when energized, spring means for disengaging said pawl, said solenoid comprising an energizing coil and a holding coil which when both are energized engage the pawl, an accelerator for the vehicle, a switch in series with said energizing coil, a pair of switches for grounding a point in the ignition system for deenergizing the system when both the switches are closed, one of said last-named switches being under the control of said accelerator to be closed when the accelerator is moved to an open throttle position, and a delay relay actuating said two first-named switches and having an actuating winding, said switch in series with said energizing winding being opened upon energization of the delay relay and the other switch actuated by the delay relay being closed upon energization of the relay, the actuating winding of said delay relay being connected in series with said holding coil of said solenoid whereby the solenoid and delay relay are energized simultaneously and whereby the holding coil causes a greater delay in the relay.

13. In a transmission control device for an automotive vehicle having an engine ignition system, the combination of a positive coupling having an engageable and disengageable movable coupling element, an electric solenoid for moving said movable coupling element and comprising an energizing coil and a holding coil, said two coils when both are engaged functioning to move the coupling element into energized position and said holding coil being adapted to alone hold it in this position, a switch in series with said energizing coil, a second switch, a delay relay for actuating both of said switches and being adapted when energized to open said first-named switch and to close said second-named switch, a relay having a switch therein for breaking a supply of current to said ignition system and connected with said second-named switch, said first-named switch being closed long enough after energization of the delay relay so that said energizing coil is effective along with said holding coil to move said coupling element to its engaged position and said second-named switch being closed long enough after deenergization of said delay relay to permit disengagement of said positive coupling.

WILLIAM V. HARRISON.

References Cited in the file of this patent

UNITED STATES PATENTS

| Number | Name | Date |
|---|---|---|
| 2,066,873 | Barnes | Jan. 5, 1937 |
| 2,087,216 | Betz | July 13, 1937 |
| 2,147,733 | Coyne | Feb. 21, 1939 |
| 2,159,426 | Dunn | May 23, 1939 |
| 2,214,099 | Claytor | Sept. 10, 1940 |
| 2,214,100 | Claytor | Sept. 10, 1940 |
| 2,214,986 | Barnes | Sept. 17, 1941 |
| 2,241,632 | Claytor | May 13, 1941 |
| 2,243,111 | McFarland | May 27, 1941 |
| 2,247,164 | Butzbach | June 24, 1941 |
| 2,257,838 | Claytor | Oct. 7, 1941 |
| 2,267,603 | Claytor | Dec. 23, 1941 |
| 2,281,916 | Claytor | May 5, 1942 |
| 2,283,623 | Claytor | May 19, 1942 |
| 2,306,865 | Claytor | Dec. 29, 1942 |
| 2,319,226 | Griswold | May 18, 1943 |
| 2,323,340 | McFarland | July 6, 1943 |
| 2,328,291 | Osborne | Aug. 31, 1943 |
| 2,330,407 | Claytor | Sept. 28, 1943 |
| 2,339,750 | Bartholy | Jan. 25, 1944 |
| 2,344,178 | Sparrow | Mar. 14, 1944 |
| 2,350,938 | Sparrow | June 6, 1944 |
| 2,380,717 | Beltz | July 21, 1945 |
| 2,445,561 | Carnagua | July 20, 1948 |